G. HEIDELBERG.
SPOON AND FORK CONSTRUCTION.
APPLICATION FILED JAN. 24, 1914.
1,133,026.
Patented Mar. 23, 1915.
Fig: 1.
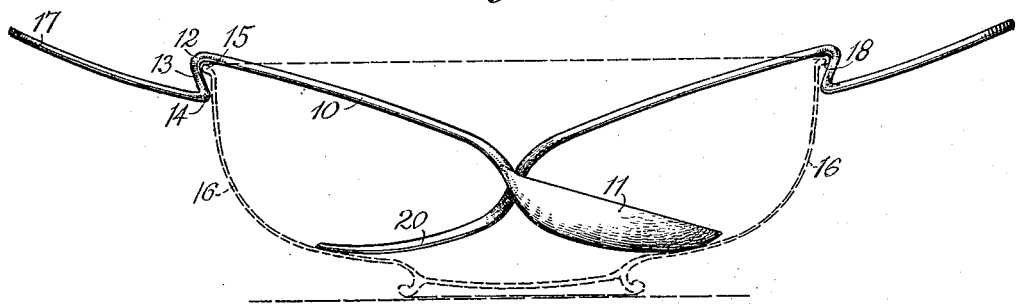
Fig: 2.
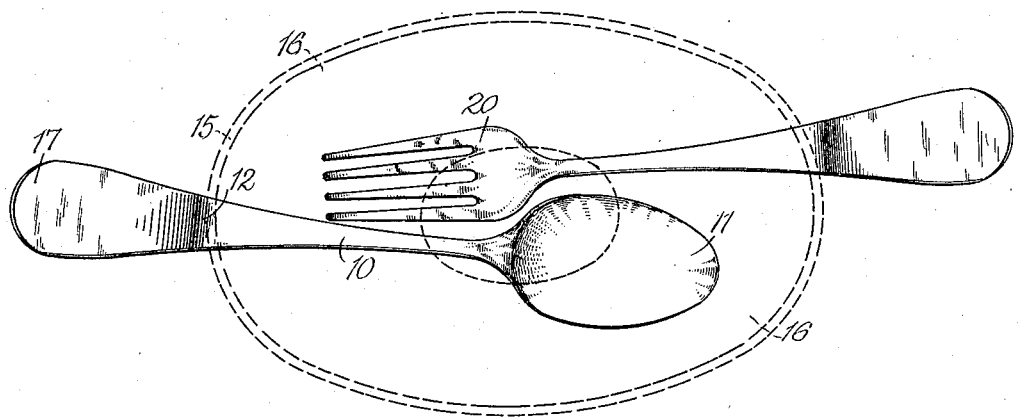
Fig: 3.
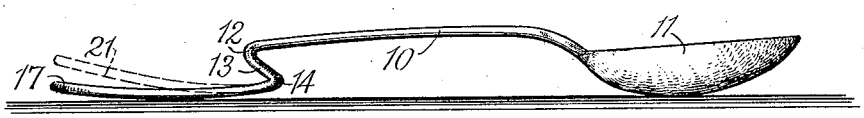
Witnesses:
Joseph H. Niles
A. Hogg.
Inventor
Gustav Heidelberg,
By his Attorney
Carl P. Goepel.

UNITED STATES PATENT OFFICE.

GUSTAV HEIDELBERG, OF NEW YORK, N. Y.

SPOON AND FORK CONSTRUCTION.

1,133,026.        Specification of Letters Patent.      Patented Mar. 23, 1915.

Application filed January 24, 1914. Serial No. 814,102.

*To all whom it may concern:*

Be it known that I, GUSTAV HEIDELBERG, a citizen of the United States of America, residing in New York, in the State of New York, have invented certain new and useful Improvements in Spoon and Fork Construction, of which the following is a specification.

This invention relates to a spoon and fork construction which has a self-supporting engagement with the edge of a vessel when disposed therein and which will maintain a horizontal position for holding the contents of the bowl when laid down outside the vessel.

In the accompanying drawing, Figure 1 is an elevation showing a spoon and a fork, each embodying the invention, Fig. 2 is a top-view of Fig. 1, and Fig. 3 is a side-view of a spoon embodying the invention.

Similar reference numerals indicate corresponding parts in the figures.

This article of tableware consists of a one-piece structure and comprises a bowl 11, a shank 10 extending backward from the upper rear edge of the bowl, a downwardly bent hook 13 at the outer end 12 of said shank at an acute angle thereto and the handle proper 17 extending backward from the lower end or nose 14 of said hook at an acute angle thereto. The hook 13 is directed backwardly upon the handle, that is to say, the direction of the hook, as will be seen from the figures, is toward the bowl, whereby a secure hook is produced and not merely an offset in the handle. The extent of this rearward bending, namely the degree of angle, is such as to cause the lower or outer end or nose 14 of the hook to be located, when the spoon is in use as seen in Fig. 1, vertically beneath the bead 15 which is ordinarily found at the outside of the rim of a soup-tureen or other vessel 16 with which the spoon may be used. When in position within the vessel, the bowl 11 rests on the bottom of the vessel and is retained from slipping farther therein by the hook 13 which is engaged with the rim and extends beneath the bead. The extension of the hook to a point beneath the bead 15 prevents disengagement of the spoon by a mere accidental contact of the spoon-end 17 with any object, and requires that a slight rearward movement be first given to the spoon and then the same may be readily lifted by the hand of the user grasping the rear-portion 17 of the handle. When replacing the spoon in the vessel, the hook is placed over the bead 15 of the vessel-rim, and the spoon slips readily into place by gravity. The body of the handle in rear of said hook is depressed and has a bearing surface substantially even with that of the bowl and the shank of the handle extending between said bowl and said depressed portion is elevated. A spoon thus constructed has by its hook a self-supporting engagement with the edge of the vessel when disposed therein, by its lower depression at the outer end of the handle it will maintain a horizontal position for holding the contents of the bowl when laid down outside the vessel and the elevated shank between the bowl and the depressed outer end serves as a handle proper for grasping the device when laid down. The bent handle thus performs a triple function of supporting the spoon within the vessel, maintaining it in operative position when outside the vessel, and providing a handle proper between its extremities for readily grasping the device when in a horizontal position.

In order to prevent abrasion and wear of the hook on the rim of the vessel, which rim is frequently coated with gold or other easily worn trimming or decoration, the degree of return bend of the handle may be so great as to cause the point 13 of the hook to engage with the side of the vessel, below the bead 15, and hold the upper portion of the hook laterally outward out of contact with the lateral face of the bead. Such construction is indicated in Fig. 1, in which a space is seen at 18 between the lateral exposure of the bead and the pit of the hook. It is obvious that any degree of return bend may be employed which will secure the necessary resistance to displacement of the instrument by engagement of the hook with the bead when the instrument is lifted by its handle, and which will also cause the hook to engage the bead only, when at rest, or the vessel-side only, as with the fork 20 in Fig. 1, or with both, so as to distribute the slight abrasion of the hook and thereby prevent injury to the vessel. The outer end 17 of the handle of the instrument may be located substantially in the plane of the bowl of the spoon, as shown in full lines in Fig. 3, but for producing better balance of the instrument the outer end is bent upwardly as indicated in dotted lines 21, thereby bringing the outer end into the plane of the forward portion of the handle, whereby the balance of the spoon is retained.

The term bowl in the claim may include either a forked bowl or a solid bowl.

I claim:

An article of tableware consisting of a one-piece structure comprising a concave bowl, a shank extending backward from the rear edge thereof, a downturned hook at the outer end of said shank forming an acute angle therewith, and a handle proper extending rearward from the lower end of said hook at an acute angle thereto and forming a rest substantially in the plane of said bowl, said shank forming an elevated bridge between said bowl and handle adapted to serve as a grip when the spoon is in horizontal position.

In testimony, that I claim the foregoing as my invention, I have signed my name in presence of two subscribing witnesses.

GUSTAV HEIDELBERG.

Witnesses:
JOSEPH H. NILES,
F. HOGG.

Copies of this patent may be obtained for five cents each, by addressing the "Commissioner of Patents, Washington, D. C."